(12) United States Patent
Bencheqroun et al.

(10) Patent No.: US 7,912,191 B2
(45) Date of Patent: Mar. 22, 2011

(54) METHOD AND SYSTEM FOR MONITORING TRAFFIC REVENUE FLOWS FOR COMMUNICATIONS COMPANIES

(75) Inventors: Mehdi Bencheqroun, Paris (FR); Xavier Lesage, Neuilly sur Seine (FR); Christophe Scholer, Lyons (FR)

(73) Assignee: Araxxe, Neuilly sur Seine (FR)

( * ) Notice: Subject to any disclaimer, the term of this patent is extended or adjusted under 35 U.S.C. 154(b) by 1147 days.

(21) Appl. No.: 11/606,035

(22) Filed: Nov. 30, 2006

(65) Prior Publication Data

US 2008/0130850 A1    Jun. 5, 2008

(51) Int. Cl.
*H04M 11/00* (2006.01)
(52) U.S. Cl. ............. 379/114.04; 379/114.03; 455/406; 455/408
(58) Field of Classification Search .................. 379/116, 379/118, 119, 121.01, 121.05, 126, 127.06, 379/114.03, 114.04; 455/406, 408; 705/7, 705/11, 400, 412, 40, 34
See application file for complete search history.

(56) References Cited

U.S. PATENT DOCUMENTS

| | | | |
|---|---|---|---|
| 6,366,889 B1 | 4/2002 | Zaloom | |
| 6,546,093 B1 | 4/2003 | Klose et al. | |
| 7,269,407 B2 * | 9/2007 | Carmon et al. | 455/406 |
| 2004/0058668 A1 | 3/2004 | Russel et al. | |
| 2004/0153382 A1 * | 8/2004 | Boccuzzi et al. | 705/34 |
| 2006/0248010 A1 | 11/2006 | Krishnamoorthy et al. | |

FOREIGN PATENT DOCUMENTS

| | | |
|---|---|---|
| DE | 100 11 986 | 1/2001 |
| EP | 1094678 | 4/2002 |
| WO | 9901974 | 1/1999 |
| WO | WO 03/096661 | 11/2003 |
| WO | WO 2004/070555 | 8/2004 |

OTHER PUBLICATIONS

Anonymous, "Revenue Assurance and Service Assurance Services", Internet Article [Online], Nov. 26, 2005, Retrieved from the Internet: URL:http://web.archive.org/web/20060502014309/www.araxxe.com/index.php?option=com_content&task=view&id=12&Item=40>, [retrieved on Feb. 27, 2009], XP002512079.
International Search Report mailed Feb. 4, 2009 from corresponding PCT/EP/2007/062987.

* cited by examiner

*Primary Examiner* — Melur Ramakrishnaiah
(74) *Attorney, Agent, or Firm* — Young & Thompson

(57) ABSTRACT

A method for monitoring traffic revenue flows for a plurality of communications companies using Information Technology (IT) systems, including the following steps
(v) designing an optimal sample of transactions that maximizes the probability of detecting billing errors done by the communications companies;
(vi) executing transactions from the optimal sample of transactions through a plurality of communications networks and recording test transactions data ,using concurrently a shared infrastructure comprising a plurality of robots for generating the transactions;
(vii) collecting invoice lines from the IT systems in a non intrusive way, through an automated browsing of the web sites of the communications companies; so as to extract billing data for each test transaction, and
(viii) processing the recorded test transactions data so as to re-rate billing for the test transactions, and matching said re-rated transaction billing data to billing data invoice extracted from the collected invoice lines, so as detect billing errors.

19 Claims, 12 Drawing Sheets

2-Optimal Sample

1-Optimal Sample

US 7,912,191 B2

METHOD AND SYSTEM FOR MONITORING TRAFFIC REVENUE FLOWS FOR COMMUNICATIONS COMPANIES

BACKGROUND OF THE INVENTION

The present invention concerns a method and a system for monitoring traffic revenue flows for Communications Companies using an Information Technology system.

Communication Companies encounter financial revenue leakages due to problems in building and operation of more and more complex information technology systems and network components. Discrepancies in the billing process may derive either from fraudulent activity, from human errors in operations or from technical errors in hardware and software.

Document WO 04/070 555 discloses a system and method for determining billing discrepancies within a communication system. In this system, operation data collected within the communication system are compared to billed data. Documents WO 03/096661 and DE 100 11 986 describe call generation systems that remotely operate wireless devices for testing and accounting purpose. These call generation systems may enable the separation of the SIM card and the wireless device.

Present methods for detecting revenue leakages or technical problems by the mean of call generation does not provide any structured way to design optimal Call Campaigns maximizing the level of discovery.

In present discrepancy detection systems, the way of collecting operation data can be qualified as intrusive since it requires inserting data collection mechanisms within the monitored Information Technology systems and communications networks of the Communications Company.

In present discrepancy detection systems, comparisons are usually performed at an aggregated level (i.e. by comparing total duration of transaction, total number of Transactions or total amount of a specific type of Transactions flowing between two specific systems during a specific time slot); this aggregation limits the accuracy of revenue leakages detection because of "flow effects" that hide the small discrepancies looked for.

Present discrepancy detection systems are not able to reconcile the billed data produced by the Communications Companies with the logs produced by the call generation systems, for the complex billing schemes implemented by the Communication Companies that sometimes lead to multiple Invoice Lines for one single Transaction.

SUMMARY OF THE INVENTION

These drawbacks are overcome with an invention for monitoring traffic revenues for a Communications Company using an Information Technology system, comprising:
(i) means to design an optimal Sample of Transactions that maximizes the probability of detecting Billing Errors done by the Communications Company;
(ii) means for executing and recording test Transactions on a global scale with different types of fixed and mobile types of Communications Networks for different Communications Companies using concurrently the said invention;
(iii) means for collecting Invoice Lines from the Information Technology systems of the Communications Companies in a non intrusive way;
(iv) means for processing data and checking that the billing of each individual Transaction is correct by matching it with one or more Invoice Lines produced by the Communication Company.

The Revenue Assurance monitoring method based on the Information Technology system comprises the following steps:
Step 1: Define Revenue Assurance objectives and risks
Step 2: Model the Total Metering and Billing Scheme (TMBS) and the Customer Traffic Pattern of the Communications Company
Step 3: Define the set of testing constraints that are to be respected by the Call Campaign
Step 4: Design optimal Sample of Transactions by using the Backward Slicing™ method
Step 5: Allocate technical resources for a Call Campaign
Step 6: Group Transactions into a Call Campaign
Step 7: Install SIM cards and fixed lines into the Robots and SIM Server
Step 8: Configure the Robots so as they execute the Transactions defined in the Call Campaign
Step 9: Collect the Robots Logs with the detailed features of Transactions executed by the Robots
Step 10: Collect Billing data from the Communications Company information systems in a non intrusive way
Step 11: Individually re-rate Transactions and match them with Invoice Lines produced by the Communications company
Step 12: Produce reports listing any spotted discrepancy The Information Technology system enables the planning of Call Campaign, the generation of Transactions, the collection of Invoice Lines and the automatic re-rating reconciliation of Transactions records with Invoice Lines for different Communications Companies using the system concurrently.

GLOSSARY OF TERMS

Figure 1:
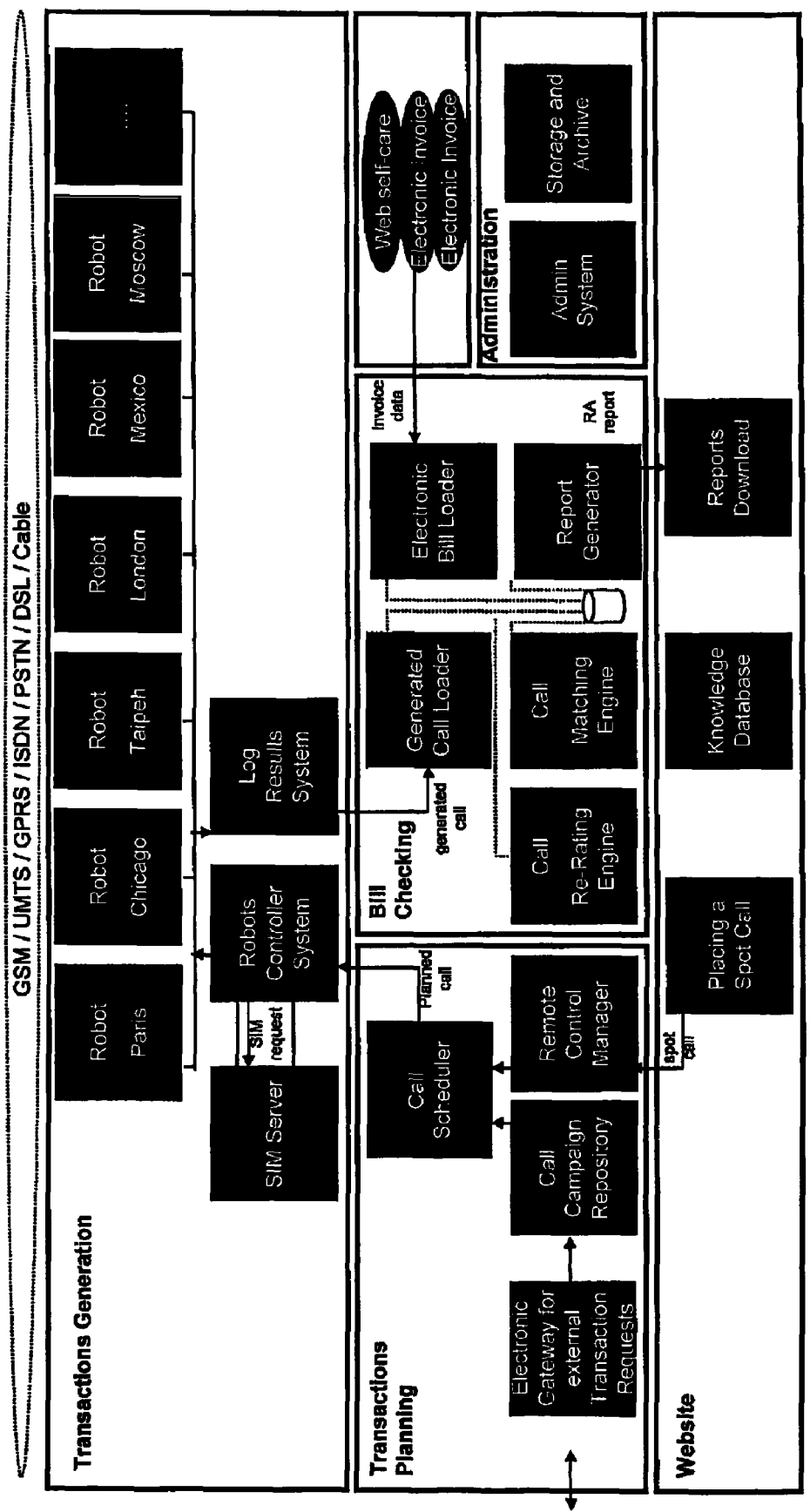
FIG. 1 features the architecture of a monitoring system according to the invention.

1-Optimality (of a Sample of Transactions): a Sample of Transactions is 1-optimal for a given TMBS if it maximizes the probability of discovering one billing error while respecting a Set of Testing Constraints.

N-Optimality (of a Sample of Transactions): a Sample of Transactions is N-optimal if it maximizes the probability of discovering N different Billing Errors while respecting a Set of Testing Constraints.

Backward Slicing™ Algorithm: method to build a Sample of Transactions that is optimal according to the business objective of detecting as many different Billing Errors as possible, while respecting a Set of Testing Constraints.

Billing Error: mistake performed within one Component of the TMBS of a Communications Company (incorrect duration, incorrect timestamp, incorrect rate, lost records . . . ) that leads to an incorrect billing to the customer.

Bucket: special price scheme offered by some Communications Companies to their customers. A Bucket typically involves a fixed price for a certain amount of minutes of calls (e.g. 30 dollars for 2 hours of mobile to mobile calls). The checking of proper billing of calls in a Bucket are tricky because of "Domino Effect" and "Frontier Effect" as described later in this document.

Call Detailed Record: every Transaction leads to one Call Detailed Record that is generated from the initial network equipment and further processed by IT systems.

Call Campaign: group of Transactions achieving one or several business objectives.

Communications Company: A Communications Company is a company that generates and bill traffic to its customer for the use of one or more telecommunications networks. A Communications Company may be an operator, a telecommunications company, an internet service provider, a content provider, etc.

Component: individual system within a TMBS that is modelled as a black box with an Error Probability.

Contention: Situation in which a user plans a call from (or to) a SIM card at a specific location and the SIM card has already a call planned at the same time or is allocated at another location.

Customers Traffic Pattern (of the Communications Company): description of traffic flows within all Components of the TMBS of a Communications Company.

Compound Error Probability (of a TMBS): probability that the processing of one Transaction by a TMBS leads to one billing error.

Depth (of a layer): indication of how deep a Layer of Components is situated in the flow of CDRs. The most downstream layer is at depth 0, the layer just upstream of layer at depth 0 is at depth 1, and so on.

Error Detection Probability (of a sample of Transactions): probability that the processing of a Sample of Transactions by a TMBS leads to at least one billing error.

Error Probability (of one Component of a TMBS): probability that the processing of one Transaction by one Component of a TMBS leads to at least one Billing Error.

Error Probabilities Distribution (of a TMBS): set of Error Probabilities of all Components of a TMBS.

Identity (of 2 Billing Errors): Two Billing Errors are hold different if they occur in different Components of the TMBS Model.

Invoice Line (or Invoice Item): Itemized element in the invoice sent by a Communications Company to its own customers. In case of prepaid customers the Invoice Line is a debit in the prepaid platform.

MSC (Mobile Switching Centre): A network equipment often found in mobile communications network.

Revenue Assurance: activities performed by Communication Companies to check that they bill all that should be billed timely and correctly.

Robot: Device used to generate a Transaction on a fixed or a mobile telecommunications network. Robots embed communications equipments like phones and modems.

Robot Log: Technical record generated for a Transaction. The record stores all the detailed features of the Transaction.

Set of Testing Constraints: constraints that a Communications Company imposes to reduce cost of testing.

SIM Multiplexing: capability offered by the monitoring method according to the invention.

SIM Card (Subscriber Identification Module): chipset uniquely identifying the mobile subscriber of a Communications Company.

SIM Assignment: action of registering at any time a SIM card in a Robot located within or outside your network. This assignment makes the Robot behave exactly as if the SIM Card was physically inserted into one of its phone.

SIM Server: Device used to store in a central place all the SIM Cards of the Communications Companies accessing the monitoring system.

SMS Centre: Short Message Service Centre. A network equipment often found in mobile communications network.

Spot Calls: Specific Transactions ordered through the management website by the Communications Companies.

TMBS (Total Metering and Billing Scheme): the set of all network equipments and billing systems that generate and process the Call Detailed Records to produce the Invoices of the customers of one Communications Company.

TMBS Model: A mathematical model of the real TMBS of a Communications Company. The TMBS Model is made of Components modelled as black boxes with error probabilities. The TMBS Model is used for designing an optimal Sample of Transactions.

Transaction (synonymous of "call"): communication service (Voice call, Wap session, SMS, MMS, video streaming, ring tone download, etc.) involving an initiating party and a terminating party. These parties are identified by their MSISDN, or their ISDN or their http address.

Transaction Request: a request received by the invention to execute at a certain point of time a specific type of Transaction.

DETAILED DESCRIPTION OF THE PREFERRED EMBODIMENTS

The traffic revenues monitoring system made according to the invention comprises, with reference to FIG. 1, a Transactions planning sub-system, a Transactions generation sub-system, a bill-checking sub-system, an administration module, and a management website.

The Transactions Planning sub-system includes a Call Campaign Repository module, a Remote Control Manager module, A Transaction Requests Gateway, and a Call Scheduler module.

The Transaction Generation sub-system includes a SIM sever, a Robots Controller system, a Log Results system and a plurality of Call Robots located in various places throughout the world.

The Bill Checking sub-system includes a Generated Call Loader, a Call Re-Rating Engine, A Call Matching Engine, an Electronic Bill Loader, and a Report Generator.

The Administration module includes an Administration System and Storage and Archive units.

The Robots that generate all the Transactions are special equipments that manage a set of different communications equipments. A Robot comprises a backplane, a SIM emulator module, an antenna, physical ports for connecting fixed lines and broadband connections, communication equipments, etc. Communications Equipments may be mobile phones, analogue modem, digital modem, network cards or similar devices. Depending on the various needs in the different geographies, Robots are equipped with different set of communications equipments. During lifecycle of Robots, new equipments can be added to or removed from the Robots slots. The Robots role is basically to execute the Transactions Requests received from the call planning domain and to report accurately on the executed Transaction details.

Figure 2:
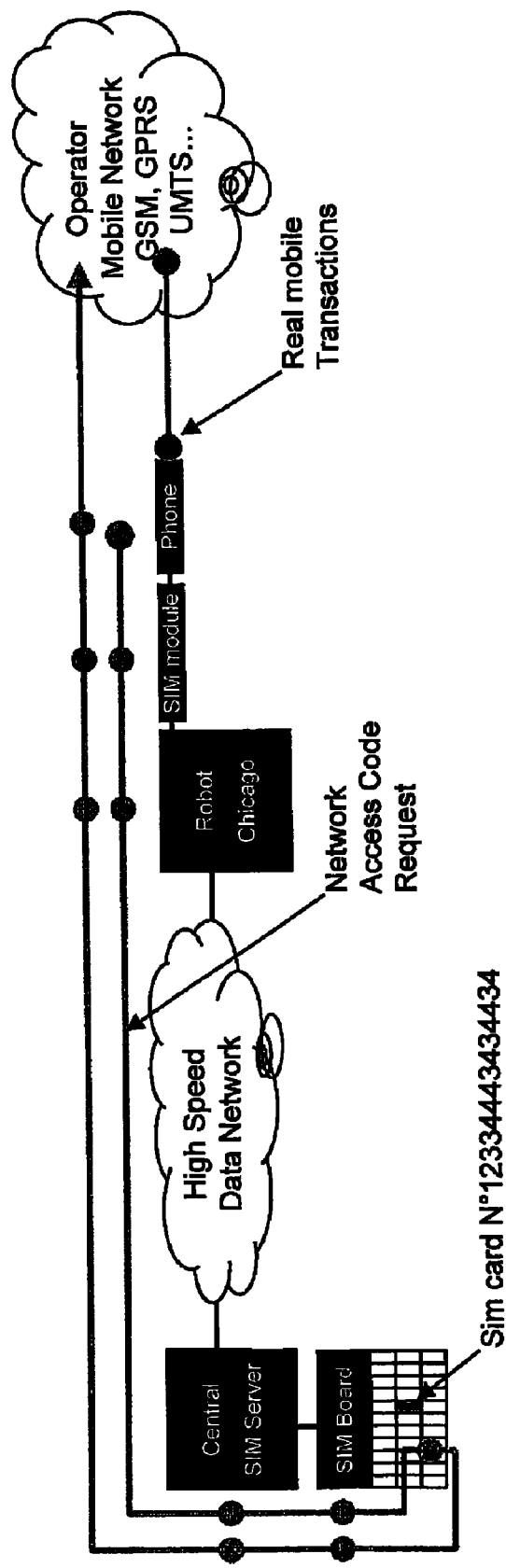
FIG. 2 illustrates connection between a call Robot and a SIM server within the monitoring system of FIG. 1.

The SIM Cards of Communications Companies are stored in a central SIM Server, which is a hardware equipment with several boards hosting a large number of SIM Cards. When a mobile phone executes a call, the corresponding Robot accesses the SIM Card through a special request on a data network. See FIG. 2 for details. The SIM Server provides the identity data for the phone to access the mobile network. This does not change anything to the nature of the call even if there are thousands of kilometers between the phone and the SIM cards. The use of the SIM server brings two main benefits:

Enhancing Security: SIM cards are stored in a central, secured location instead of being spread all over the world;

Reducing Operational Costs: Unlike Service Assurance activities, Revenue Assurance activities lead to more frequent operations on SIMs (e.g. adding new <<real>> subscriptions based on new tariff plans), which are costly if SIMs are spread around the world.

Users of the monitoring method according to the invention may specify the calls they wish to execute through several modes:

a "spot call": the user directly orders a call on the secured website. The call request is automatically processed by the planning engine and inserted in the plan;

an "explicit call campaign": the user sends to central site a spreadsheet with a list of calls to be placed. The list is uploaded and a complementary analysis is performed, like resources contention.

an "implicit call campaign": the user requires to perform a set of calls that are loosely defined but that addresses a specific business needs (e.g. check long calls overlapping two bill cycles).

An "automated Transaction Request" sent automatically to the system. A gateway exposes different web services enabling Communications Companies to place automatically testing Transactions requests from other Information Systems they may have already built.

A call scheduling engine has been developed to:
check the rights of executing calls;
detect resources contentions;
manage priorities;
re-schedule calls that could not be executed.

A special module is designed to upload billing data from Communications Companies infrastructure for the traffic generated by the invention. The preferred source of billing data is non intrusive, i.e. data is already available for end-customers, such as electronic invoice data provided on the web site offered by the operator for self care. This source of billing data is preferably "most downstream", i.e. data is very downstream in the CDR life cycle chain from CDR production to mediation to guiding to rating to billing to bill presentation. A practical way to get billing date is to collect filtered data at the bill presentation stage. The billing data uploading module is adaptive to different sources of data.

The re-rating module computes the rate of the Transactions according to the billing schemes of the Communications Company.

The matching module correlates executed Transactions and Invoice Lines.

A dedicated website is the main interface for user teams to manage the service. The web site offers the following features:

accessing revenue assurance reports about identified Billing Errors and overall billing performance;
ordering a spot calls for further investigation of a spotted discrepancy;
browsing a knowledge base.

Revenue Assurance Monitoring Method

Step 1: Define Revenue Assurance Objectives and Risks

The first step of the Revenue Assurance monitoring method according to the invention consists in defining and formalizing the Revenue Assurance objectives that the Communications Company wants to achieve. The objectives may be one or more amongst the following list:

benchmarking a company performance against peers by comparing billing performance with reliable performance indicators;

addressing a particular risk known in a specific revenue stream of the Communications Company;

tracking operations incidents by regularly repeating the same campaign and detecting any Billing Error happening within the network or IT operations centre;

certifying the quality of the TMBS by issuing a campaign similar to the Communications Company's traffic pattern;

Testing thoroughly a new systems recently put into production by a Communications Company.

The different objectives defined in this method will be used onward for focusing the modelling of the TMBS on specific aspects of the infrastructure.

Step 2: Model the TMBS of the Communications Company

A second step in defining the call campaign is to get a model of the whole network components, service platforms and IT systems that generate revenues. The deliverable of this step is a model called a Total Metering and Billing Scheme (TMBS).

The modelling scheme is based on the following principles:

(i) A Communications Company has N Customers that generate the following Transactions: Voice call, SMS, MMS and Wap session. Every customer has one SIM card (or more generally speaking one subscription) and is assumed to generate on a monthly basis the same number of each type of Transaction.

(ii) Every Transaction leads to one and only one Call Detailed Record that is generated from the initial network equipment and further processed by one or more IT systems. It is to be noted that this principle is often not true, because some Transactions (e.g. long calls, overlapping calls) may yield more than one Call Detailed Record. This is not a problem at this modelling stage; the case of multiple Invoice Lines for one single Transaction will be addressed at a later stage.

(iii) The Total Metering and Billing Scheme (TMBS) of a Communications Company is the set of all network equipments and billing systems (called Components)

that generate and process the Call Detailed Records to produce the Invoices/Debits of the Customers.

(iv) Every single Component is modelled as a "black box" that has three features: A Component Name, an Error Probability of making a Billing Error when processing a Call Detailed Record, a share of the revenue flows of the Communications Company.

(v) All Billing Errors are considered of a unique type, independently of the encountered problems: incorrect duration, incorrect timestamp, incorrect rate, lost record.

(vi) All Billing Errors are supposed statistically independent.

The modelling process is an iterative process, because it is difficult to get upfront a full picture of all systems involved in the TMBS of a Communications Company. The granularity of modelling of each IT system may vary with time.: At first one billing system can be modelled by one black box; modelling can be limited to some revenue streams (e.g. roaming) or to all revenue streams. Later, the billing system can be modelled with three chained boxes: one for guiding, one for rating, one for invoicing. At last, the billing system can be modelled with a plurality of boxes, one box for each offering supported by the Communications Company.

The priorities defined in step 1 are used to design a detailed model for the areas at risks and a general model in the areas of lower risks.

The Error Probabilities of individual Components are usually not known in advance and the objective of Revenue Assurance projects may encompass the computation of the Error Probability of the different Components. When the Error Probability are not known, they can be assumed in a first step using market standards (0,0001 for switches and switch like Components, 0,001 for mediation systems, 0,01 for billing systems, etc.). At a later stage Error Probability will be updated with the results of the Revenue Assurance Monitoring Method.

Figure 3:
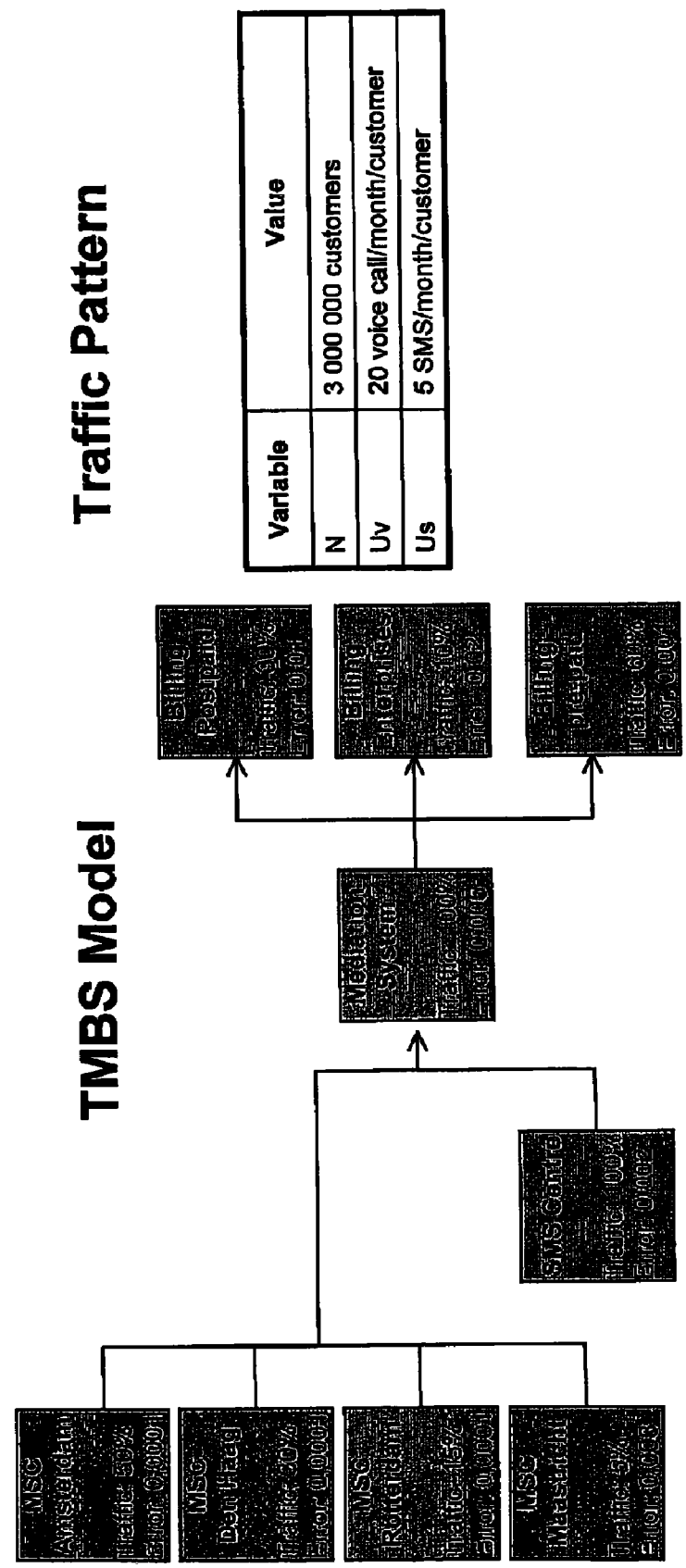
FIG. 3 features an example of the results of the modelling step of a TMBS in the monitoring method.

FIG. 3 provides an example of the model for the TMBS of a Communications Company. The TMBS has been model with 8 Components. Each Component is represented by a green box with its name, its Error Probability and its share of the revenue flows. The black arrows indicate the flows of Transactions through the different Components.

Step 3: Define Set of Testing Constraints

This step consists in defining the set of testing constraints to be respected by a Communications Company. It is essential to note the best testing campaign should in theory test all cases for all customers. This is obviously not feasible since it would require duplication of all Components of the Communications Companies. It is therefore essential to define at first the Set of Testing Constraints at and then to proceed to the design of the optimal Call Campaign respecting the Set of Testing Constraints.

Typically, the Set of Testing Constraints will include:
a limited number of locations where testing Transactions can be generated;
a limited number of subscriptions (e.g. SIM cards) to generate Transactions;
a limited capacity to generate Transactions per day in each location;
a limited budget for traffic costs of Transactions.

Step 4: Design Optimal Sample

Overview of Backward Slicing™ Method

This step consists in applying the Backward Slicing™ algorithm to the TMBS model produced by step 2 according to the testing Constraints defined in step 3.

The Backward Slicing™ algorithm is a 3-step algorithm:
a) group Components of the TMBS into layers;
b) define the optimal sample in the most downstream layer;
c) define iteratively the optimal sample in each subsequent layer by going upstream.

The section just below explains the concept of N-Optimality of a sample of Transactions; the three subsequent sections detail the different steps of the Backward Slicing™ algorithm.

Step 4: Design Optimal Sample

Overview of N-Optimality of a Sample of Transactions

The following concepts are useful when conducting Revenue Assurance activities:
Error Probabilities Distribution within a TMBS;
Error Detection Probability of a Sample of Transactions.

The Error Probabilities Distribution P of a TMBS is the set of Error Probabilities of each Component of the TMBS, and is usually a set of several probabilities of errors:

$P=\{Pmsc1, Pmsc2, Pmsc3, Pmsc4, Pmsc5, Psms, Pmed, Pbil1, Pbil2, Pbil3 \ldots\}$ The individual Error Probability of Component i is noted Error_Prob(i).

The Customer Traffic Pattern T of the Communications Company is the description of traffic flow within each Component of the TMBS, and is modelled with:
the global number of customers (N) and their average usage per day in each type of Transaction, $Tg=\{N, Tvoice, Tsms\}$;
a share (Customer_Share) of the customers traffic that flows through each Component of the TMBS:
$Ts=\{\%\ msc1, \%\ msc2, \%\ msc3, \%\ msc4, \%\ sms\text{-}c \ldots\}$
The individual flow of customers traffic that is processed by Component i is noted Customer_Flow(i):
Customer_Flow(i)=$N \times Uj \times$Customer_Share (i) (where j=voice, sms)

The Compound Error Rate of one TMBS is the probability that one Transaction leads to one billing error.

The Sample of Transactions S is a set of Transactions generated on the network to check billing accuracy, and is usually modelled with:
the global number of each type of Transactions in the sample, $Sg=\{Svoice, Ssms\}$
a share (Sample_Share) of the sampling traffic that flows through each Component of the TMBS, $Ts=\{\%\ msc1, \%\ msc2, \%\ msc3, \%\ msc4, \%\ sms\text{-}c \ldots\}$
The sample size is the total number of Transactions in the sample S=Svoice+Ssms. The individual flow of sampling traffic that is processed by Component i is noted Sample_Flow(i):
Sample_Flow(i)=$Sj \times$Sample_Share (i) (where j=voice, sms or mms)

The Error Detection Probability of a Sample of Transactions is the probability that the processing of the Sample of Transactions by one Component of the TMBS leads to at least one billing error.

A Sample of Transactions is said to be N-optimal if it maximizes the probability of discovering N different Billing Errors while respecting a Set of Testing Constraints. Two Billing Errors are hold different if they occur in different Components of the TMBS. Two errors are hold identical if they occur in the same Component of the TMBS.

It is important to note that this definition of "identity" of billing errors depends on the granularity of the modelling of the TMBS performed in step 2. The more Components are modelled, the more different billing errors can be detected.

For a TMBS with C Components, N should be inferior or equal to C, a mathematical formulation for the C-optimality of a TMBS of C parallel Components is provided here below.

P being given, let S be a Sample of Transaction of size S. The sample S can be noted as:

Ts={sample_share(1),sample_share(2), . . . ,sample_share(C)}

The probability of discovering C errors is the product of the probability of discovering one error in each Component.

Standard optimization techniques (non linear programming, optimal control or variational calculus) can then be applied to find the maximum of P while respecting a set of Testing Constraints. This gives Ts.

Figure 4:
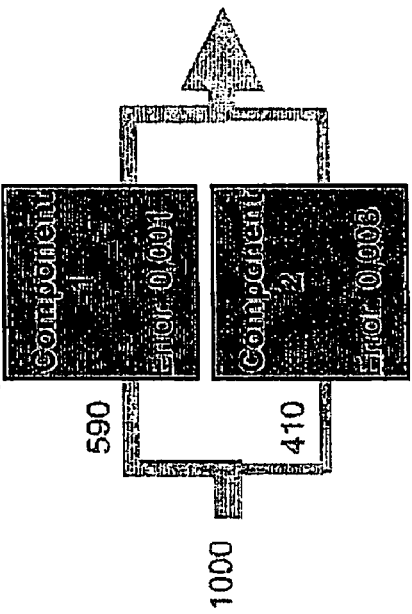
FIG. 4 features the 1-Optimal sample of Transactions and the 2-Optimal sample of Transactions for a simple TMBS made of two Components.
Figure 4:
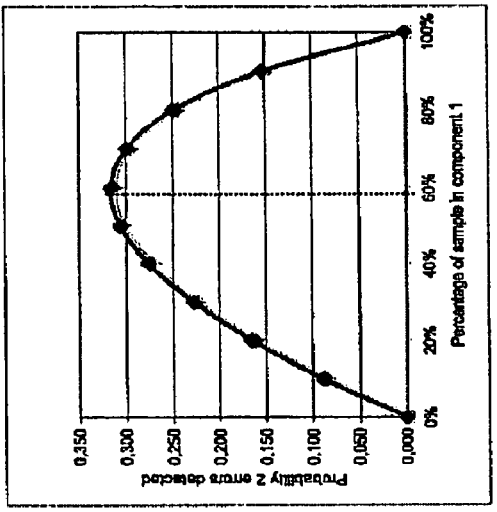
Figure 4:
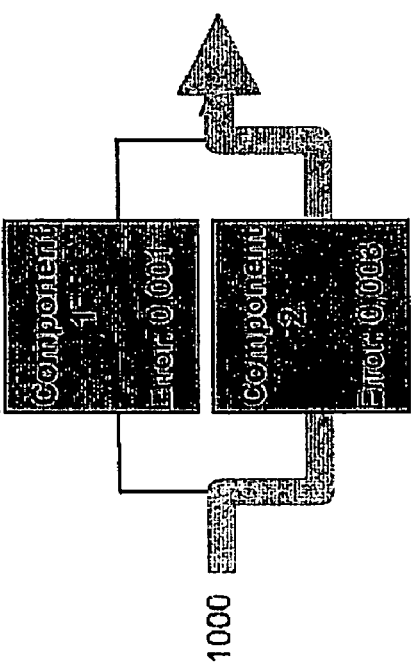
Figure 4:
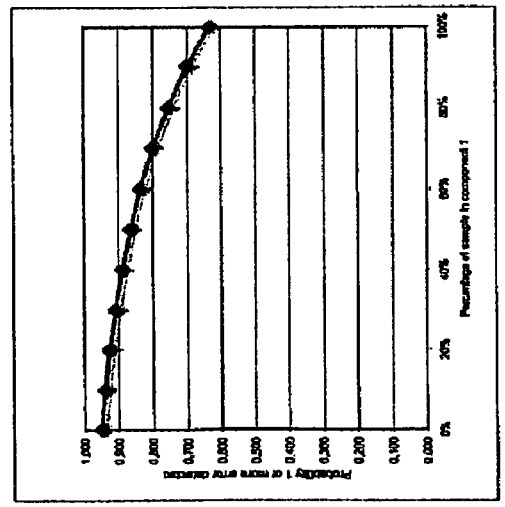

FIG. 4 illustrates the concept of N-Optimality for a very simple TMBS made of two parallel Components with error probabilities 0,001 and 0,003. Since the TMBS has just two parallel Components, the only choice to be made when designing a Sample of Transactions is to select the share of the Sample of Transaction that will go through the first Component, the rest of the Transactions are naturally flowing through the other one.

One can see on the bottom part of the left hand side of the figure that the maximum of probability of detecting one Billing Error is reached when 0% of the Transactions flow through Component 1. This is shown on the upper side of the left hand side where the 1-Optimal Sample of Transaction is indicated by the grey arrow that flows only through Component 2.

One can see on the bottom part of the right hand side of the figure that the maximum of probability of detecting two different Billing Errors is reached when 59% of the Transactions flow through Component 1 and 41% of the Transactions flow through Component 2. This is shown on the upper side of the right hand side where the 2-Optimal Sample of Transaction is indicated by two grey arrows that flow through Component 1 and Component 2.

Step 4: Design Optimal Sample

Group Components into Layers (4a)

The first step of the Backward Slicing™ algorithm consists in breaking a TMBS into several layers of Components. A layer is a group of Components of the TMBS. Each layer has a number C of Components, which have the same depth D. A Component is in one and only one layer.

The Depth is a measure of the number of layers that a single record has to flow through between its generation in the network of the Communications Company and the most upstream Component in which the record can be held as billed to a customer. The layer of the most downstream Components (i.e. the last Component through which a record flows) have a depth 0. The Components just one level upstream have a depth 1. The Components which are one level upstream to the Components of depth 1 have a depth 2, and so on by recurrence.

Figure 5:
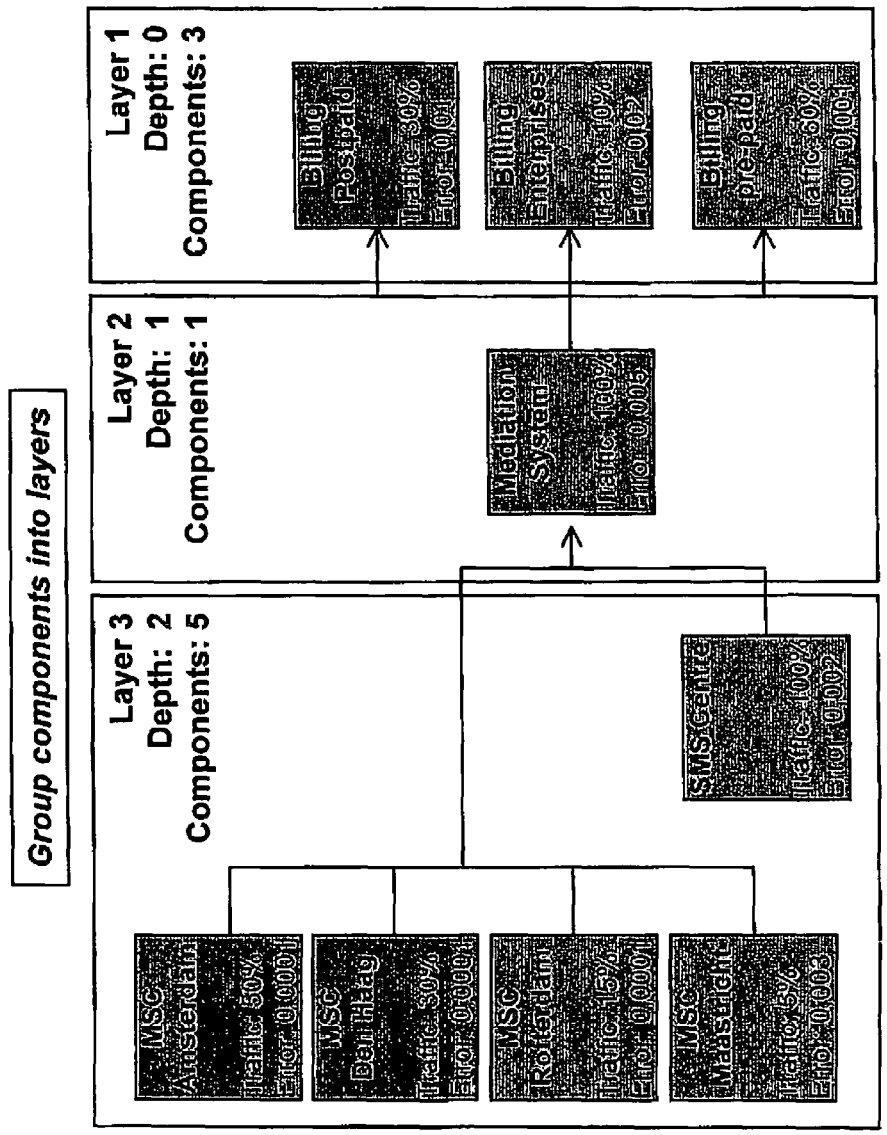
FIG. 5 features the breaking down of the TMBS featured in FIG. 3 into multiple layers of different depth.

FIG. 5 illustrates the results of the breaking down of a TMBS into different layers. The TMBS is the same as detailed in FIG. 3. The results of the grouping have led to three layers. The first layer (depth 0) is made of the three billing systems, these are the last systems in which the records are billed. The layer just upstream (depth 1) is made of only one system (called the mMediation system) that dispatches the records to the appropriate billing systems according to its own guiding rules. The third layer (depth 2) is made of the five network Components that sends their records to the mediation system.

Step 4: Design Optimal Sample

Design Optimal Sample for Layer 1 (4b)

The second step of the Backward Slicing® algorithm consists in defining the optimal sample of Transactions for the first layer of Components. This layer has a depth of 0 and has C Components.

The optimal Sample of Transactions to be found is the C-Optimal of Transactions, since there are C Components in the layer. The C-Optimal Sample of Transactions can be found by using appropriate standard optimisation techniques.

Figure 6:
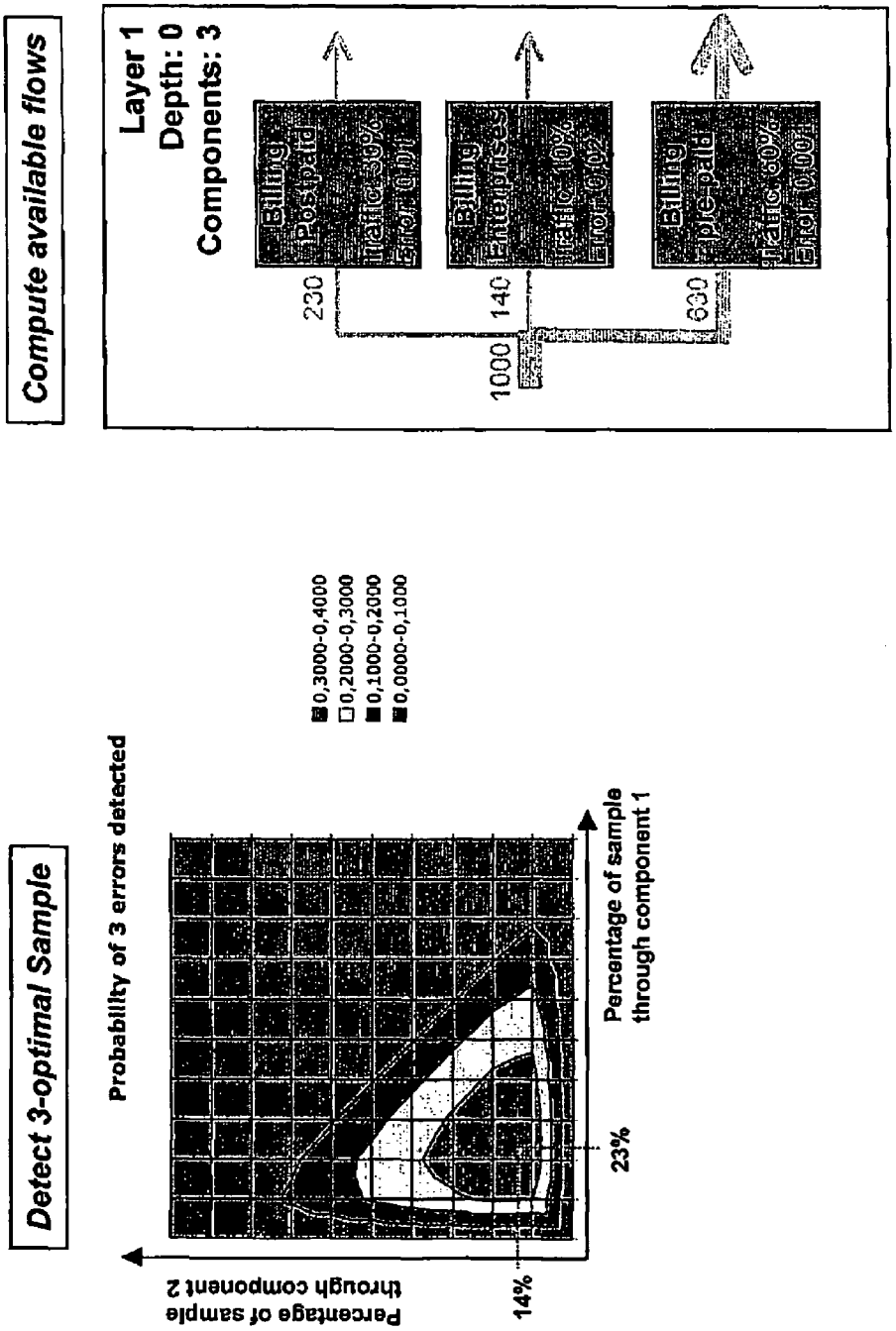
FIG. 6 features the design of a 3-Optimal Sample of Transactions of the first layer of the TMBS featured in FIG. 3.

FIG. 6 illustrates the results for designing the 3-optimal Sample of Transaction for the first layer of the TMBS detailed in FIG. 3 and grouped into layers as shown in FIG. 5. Since the TMBS has three parallel Components, the choices to be made when designing a Sample of Transactions is to select the share of the Sample of Transaction that will go through the first Component, and the share of the Transactions that should flow through the second Component; the rest of the Transactions are naturally flowing through the third Component.

One can see in the bottom part of the left hand side of the figure that the maximum of probability of detecting three different billing errors is reached when a share of 23% of the Sample of Transactions flows through Component 1 and 14% through Component 2. This leaves 63% for Component 3. Let us assume that the Set of Testing Constraints specifies that only 1 000 Transactions are to be used, the resulting Sample of Transactions is shown on the right hand side of the figure with the grey arrows indicating the number of Transactions flowing through each of the Components of layer 1 (respectively 230, 140 and 630 Transactions for Components 1, 2 and 3). One can note that the percentage of Transactions in a Component is not related to the average Traffic Pattern of customers in this Component but depends solely on the relative Error Probability of all Components.

Step 4: Design Optimal Sample

Design Optimal Sample Subsequently for All Layers (4c)

The third step of the Backward Slicing™ algorithm consists in executing the following steps for all subsequent layers L of the TMBS:

(i) Compute the resulting available flows of Transactions for layer L from the already designed flow of Transactions computed in layer of depth L−1;
(ii) Find the C-Optimal Sample of Transactions where C is the number of Components of layer L.

By recursively designing the optimal sample of Transactions in each subsequent layer, one can design the optimal Sample of Transactions for the whole TMBS.

Figure 7:
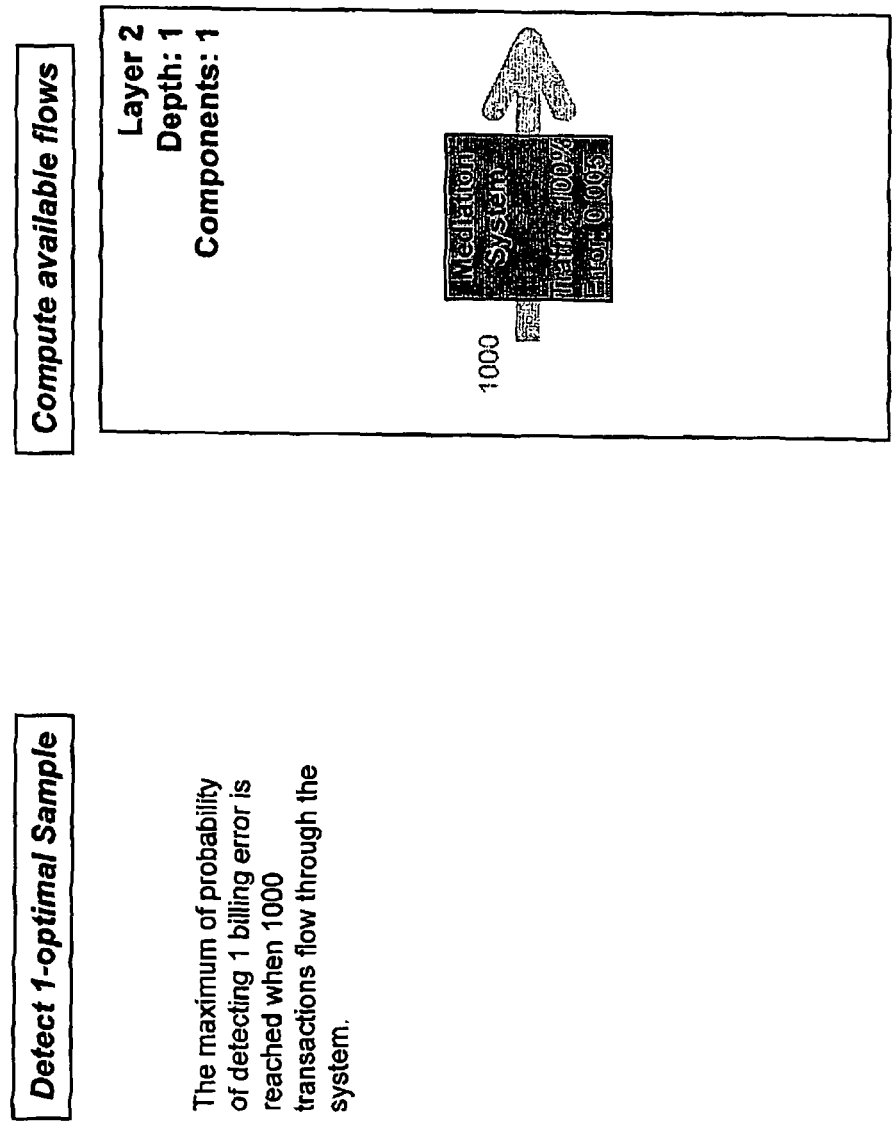
FIG. 7 features the design of a 1-Optimal Sample of Transactions of the second layer of the TMBS featured in FIG. 3.
Figure 8:
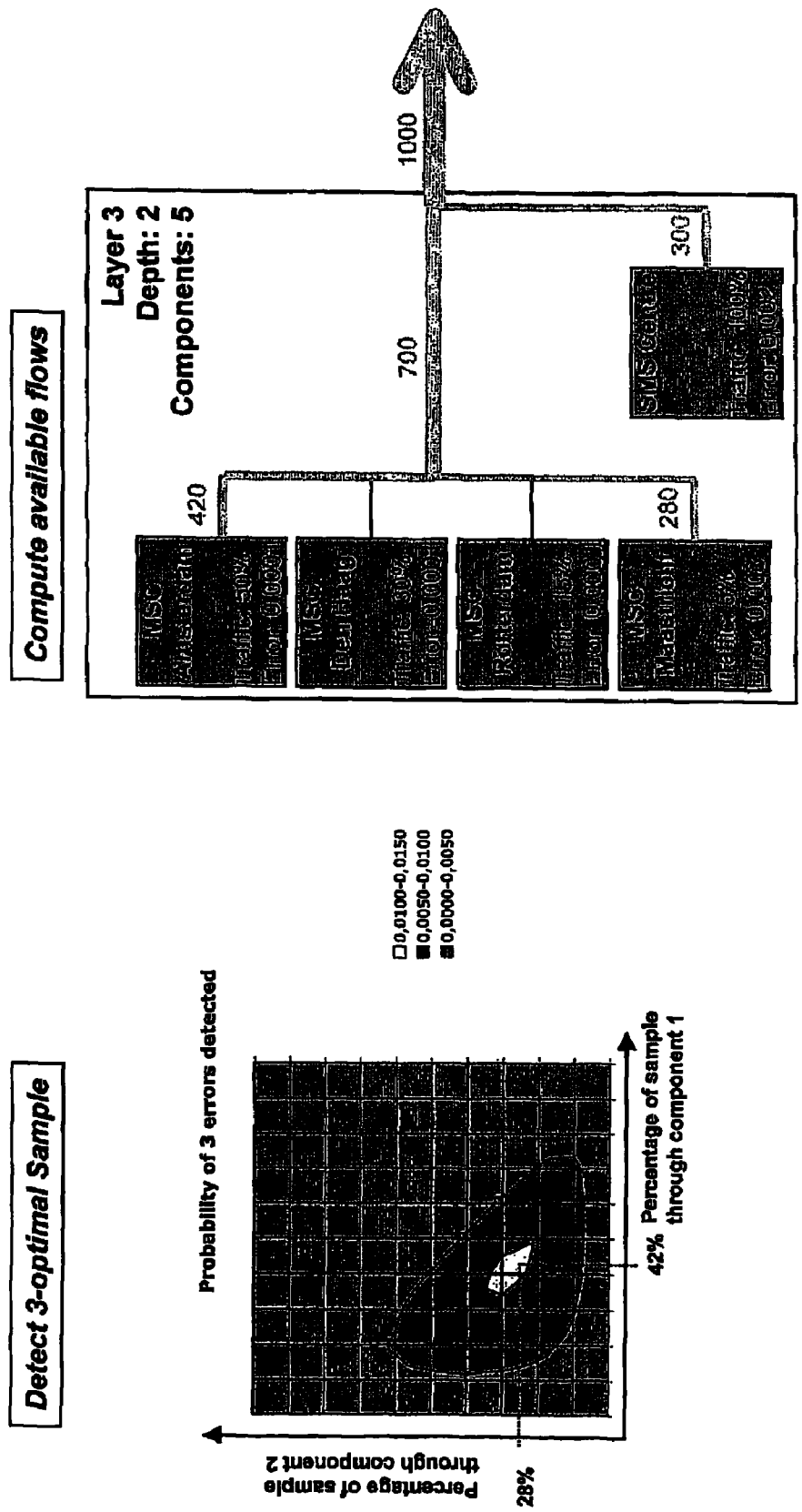
FIG. 8 features the design of a 3-Optimal Sample of Transactions of the third layer of the TMBS featured in FIG. 3.

FIG. 7 and FIG. 8 illustrate the results for designing the optimal Sample of Transactions respectively for the second and third layer of the TMBS detailed in FIG. 4 and grouped into layers as shown in FIG. 5. The result is based on the flow of Transactions designed for layer 1 as explained in FIG. 6. For the second layer, the result is trivial since there is only one Component in this layer: as one can see in FIG. 7 all available transactions have to pass through the Component. For the third layer, the calculus is more complex since there are 5 Components in this layer as one can see in FIG. 8. Let us assume that the Set of Testing Constraints imposes that only two Robots are to be used. Based on this remark, actual search for a 5-Optimal Sample of Transactions is replaced by the search for a 3-Optimal Sample of Transactions. By a calculus similar to the one described in FIG. 6, we can deduce in the left hand side of FIG. 8 that the maximum of probability of detecting three different billing errors is reached when a share of 42% of the Sample of Transactions flow through MSC in Amsterdam (or Den Haag or Rotterdam) and 28% through MSC in Maastricht. This leaves 30% for SMS Centre. The resulting Sample of Transactions is shown on the right hand side of the FIG. 8 with the grey arrows indicating the number of Transactions flowing through each of the Components of layer 1 (420, 0, 0, 280 and 300 Transactions respectively for Components 1, 2, 3, 4 and 5).

Step 4: Design Optimal Sample

Conclusion

The Backward Slicing™ algorithm provides a systematic way to design the optimal sample for maximizing the probability of detecting different Billing Errors while respecting a Set of Testing Constraints. The Transactions to be tested are also defined according to their relevance to Revenue Assurance objectives defined in step 1. The way to design campaign is usually a mixed approach using the direct application of the Backward Slicing™ algorithm to a specific modelling of the TMBS of the Communications Company and a pragmatic review of Transaction types to be generated using a check-list and an assessment of their relevance to the customer Traffic Pattern defined in step 2.

Step 5: Allocate Resources for a Call Campaign

This steps consists in allocating resources and addressing potential Resource Contentions wherein a user tries to plan a call from a SIM card at a specific location and the SIM card has already a call planned at the same time or is allocated at another location. Resources Contention types may also involve Robots use, and called numbers.

Contentions can be identified by the monitoring method according to the invention but it is better to take them into account when designing Call Campaigns. To mitigate this contention risk, during campaign design, SIM cards are frozen during a recommended latency time of 10 minutes before changing their declared location.

Step 6: Group Transactions into a Call Campaign

This step consists in grouping communications into campaigns. A Call Campaign is a group of Transactions that achieves a business objective as defined in step 1 of the Monitoring Method. A Call Campaign has a specific start date and end date, and describes all the Transactions to be placed.

Step 7: Install SIM Cards and Fixed Lines into the Robots and SIM Server

This step consists in procuring test lines, SIM subscriptions and calling cards necessary to execute all the Transactions listed in the Call Campaign. The SIM cards are to be inserted in the SIM Server. The fixed lines have to be physically connected to the appropriate ports of the Robots. The calling cards are just logically configured in the Information Technology system, since no physical embodiment is required for them.

Step 8: Configure the Robots so as they Execute the Campaign of Transactions

This step consists in logically configuring the Robots for a real execution of the Transactions listed in the Call Campaign.

Users of the monitoring method according to the invention may specify the calls they wish to execute through several modes:
- a "spot call": the user directly orders a call on the secured website. The call request is automatically processed by the planning engine and inserted in the plan;
- an "explicit call campaign": the user sends to central site a spreadsheet with a list of calls to be placed. The list is uploaded and a complementary analysis is performed, like resources contention.
- an "implicit call campaign": the user requires to perform a set of calls that are loosely defined but that addresses a specific business needs (e.g. check long calls overlapping two bill cycles).
- An "automated Transaction Request" sent automatically to the system. A gateway exposes different web services enabling Communications Companies to place automatically testing Transactions requests from other Information Systems they may have already built.

Multiple configuring methods are necessary to provide a smooth execution of multiple Call Campaigns for different Communications Companies using the invention concurrently. It is essential for the invention to work with a large number of Communications Companies to offer an automated way to receive call requests. All Transactions Requests are automatically checked by the invention before being inserted in the production plan of the Robots. This is needed to avoid Resources Contention at time of execution of the Transactions.

Step 9: Collect the Detailed Log of Transactions Executed by the Robots

This step consists in collecting the details of the Transactions executed by the Robots. One has to note that due to network, it is frequent that executed Transactions are not exactly identical to requested Transactions (i.e. the duration of the call may vary slightly, the time of the call start may vary slightly etc.). It is therefore critical to collect the accurate data of the executed Transactions for billing checking.

Step 10: Collect Invoice Lines from Communications Company in a Non Intrusive Way This step consists in collecting the invoice lines corresponding to the executed Transactions. The non intrusive method consists in connecting to the web site offered by Communications Companies to their own customers for downloading their invoices. Those web sites are usually protected by a login and a password. The invention will use the login and password provided by the Communications Companies for the testing subscriptions used in the invention. A Component of the invention will then navigate through the web site to extract all Invoice Lines and store them in the appropriate database to be used for further checking of correct billing.

This non intrusive system avoid the complex and costly process associated with the implementation of a real interface between the Information Systems of the Communication Companies and the Information Systems of the invention.

Step 11: Individually Re-rate and Match Transactions

Overview

This step consists in individually matching the details of the Transactions executed by the Robots and the Invoice Lines collected from the Communications Company.

This process requests two different actions:
a) the ability to re-rate (i.e. to compute the price again) a Transaction so as to verify that the Communications Company did not make any mistake in the price.
b) the ability to match one Transaction with one or more Invoice Lines.

Step 11: Individually Re-rate and Match Transactions

Description of Re-rating Process (11a)

The re-rating mechanism is a 3-step process:
(i) collecting Invoice Lines and rebuilding a full Raw Call Data Record (in case of multiple lines);
(ii) Re-rating Raw Transaction records according to the public catalogue of prices provided by the operator and computing a contextual rating explaining the reasons for the rating;
(iii) Comparing the price computed by the method according to the invention and the price computed by the Communications Company and reporting any discrepancy.

The re-rating engine re-rates billing data to check that the price of the Transaction computed by the billing system of the Communications Company is the right price. The re-rating module supports the pricing features implemented by Communications Companies including multi-bucket substitution chain, zoning, friends & family, adjustable bucket, roaming zoning, carry-over bucket, shared bucket etc.

The re-rating engine keeps a trace of the reasons why something is rated at a given price. Moreover it can be forced to re-rate at a false price for the purpose of further billing checking (while recording the reason for forcing). This feature enables the billing of special price schemes, called Bucket, introduced by some Communications Company. Indeed Buckets billing checking are particularly tricky to check for the two following reasons.

"Overlap Effect". Let us take the example of a customer called Jane. Jane has purchased for 30 dollars a monthly bucket 2 hours of mobile calls and let us imagine that during July, Jane performed 150 calls for a total duration of 2 hours and 30 minutes, therefore exceeding her available time. After 130 calls, she had used 1 hour 54 minutes. The 131st call had a duration of 10 minutes. This means that the Communication Company will charge Jane with two "slices" of the call: a first slice of 6 minutes will be charged at 0 dollar as part of the Bucket pricing, a second slice of 4 minutes will be charged on the basis of the duration. The Communications Company will print two Invoice Lines in the bill sent to Jane for July. Billing checking of such an overlapping call implies that two Invoice lines are matched with one Transaction.

"Domino Effect". Let us continue with the example of Jane an assume that Jane placed 100 calls during August. Let us imagine that the Communications Company made a billing error with the third call of Jane which was a very long call: instead of recording it with a duration of 200 minutes the calls was recorded with a duration of 200 seconds. This long call should have exhausted the monthly Bucket of Jane (because 200 minutes makes more than 2 hours); the remaining 97 calls should then have been billed on the basis of their duration instead of being charged as 0 dollar as part of the monthly Bucket. Billing checking implies that only the third call should be reported as a Billing Error, the other errors are just contextual errors that are linked to the previous Billing Error.

So as to take care of the effects above and also to take into account the different pricing schemes implemented by Communications Companies, the re-rating engine of the invention processes the Transactions through different stages that will enable an efficient billing checking. The different stages are the following:
(i) Raw Transaction. This record is the record as produced by the Robot.
(ii) Guided Transaction. This record has been guided to one or several customers that will be charged for this call. It is to be noted that some billing schemes involves the billing of one record to more than one customer.
(iii) Tariff Key Record. A Tariff Key Record has been guided to one tariff code.
(iv) Record Post Tariff Slicing. Some calls may have to use one or more tariff. For example if a long calls overlaps two different tariff time (e.g. a special tariff between 12:00 and 14:00 and a different during the rest of the day). In this case two Invoice Lines may be produced by the Communications Company.
(v) Record Post Bucket Slicing. Some call overlaps one bucket (see "Frontier Effect" above). In this case two invoice may be produced by the Communications Company.
(vi) Rerated Record. Some Communications merge the different legs of a Transactions so as to produce readable Invoices for their customers. In this case the records have to be merged into one single record.

Figure 9:
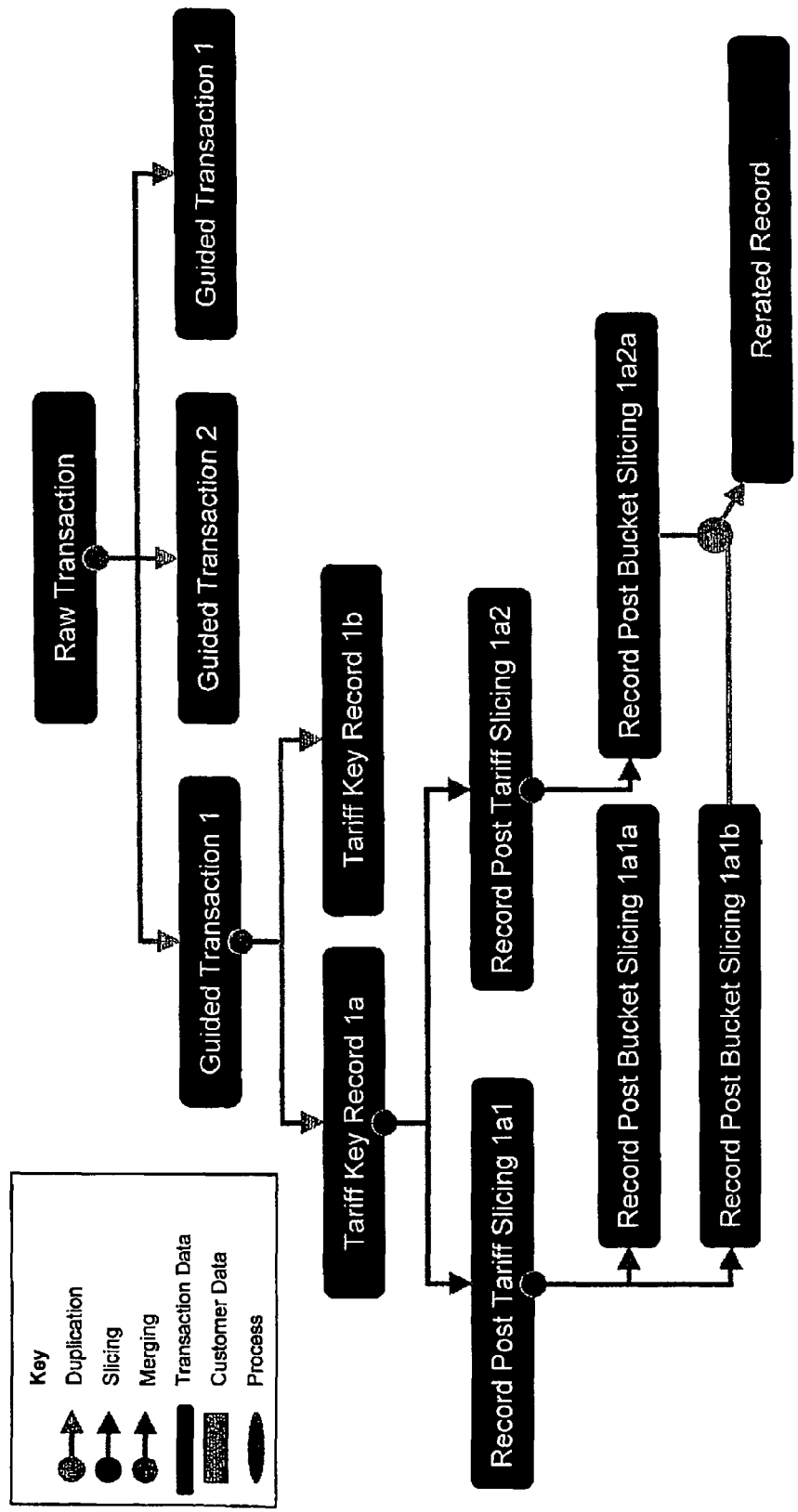
FIG. 9 provides an overview of the different stages of the processing of a Raw Transaction as logged by the Robots into a Re-Rated Record that can then be compared with Invoice Lines.

FIG. 9 provides an overview of the different stages of the processing of a Raw Transaction as logged by the Robots. The outcome of this process is one or more Rerated Record that can then be compared with Invoice Lines. The processing involves several duplication, slicing and merging that may affect the records.

Figure 10:
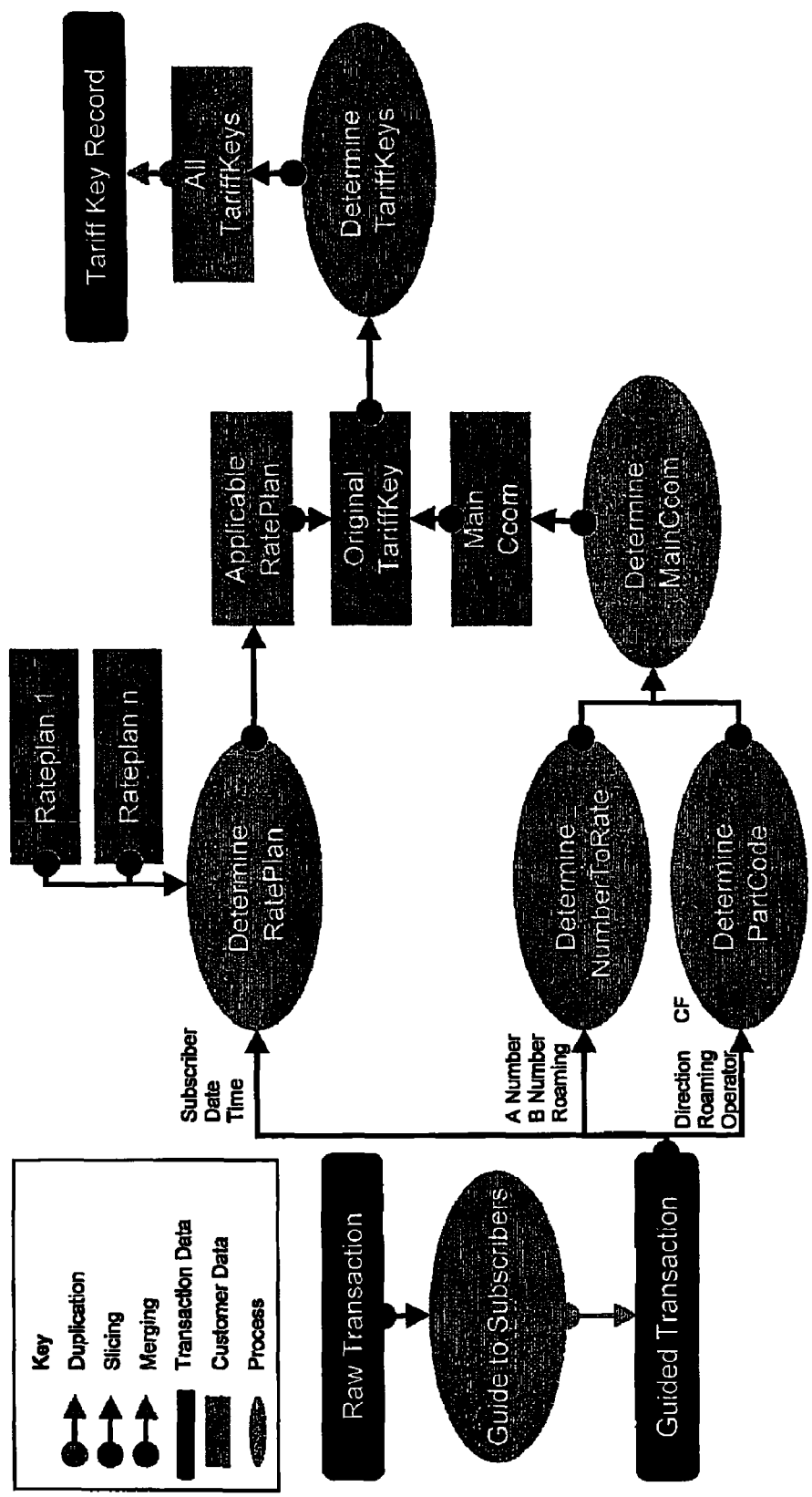
FIG. 10 provides a detailed view on how the re-rating engine processes a Raw Transaction into a Tariff Key Record.

FIG. 10 provides a detailed view on how the re-rating engine processes a Raw Transaction into a Tariff Key Record. The processing is performed on the basis on several customer data that have to be configured prior to the processing.

Figure 11:
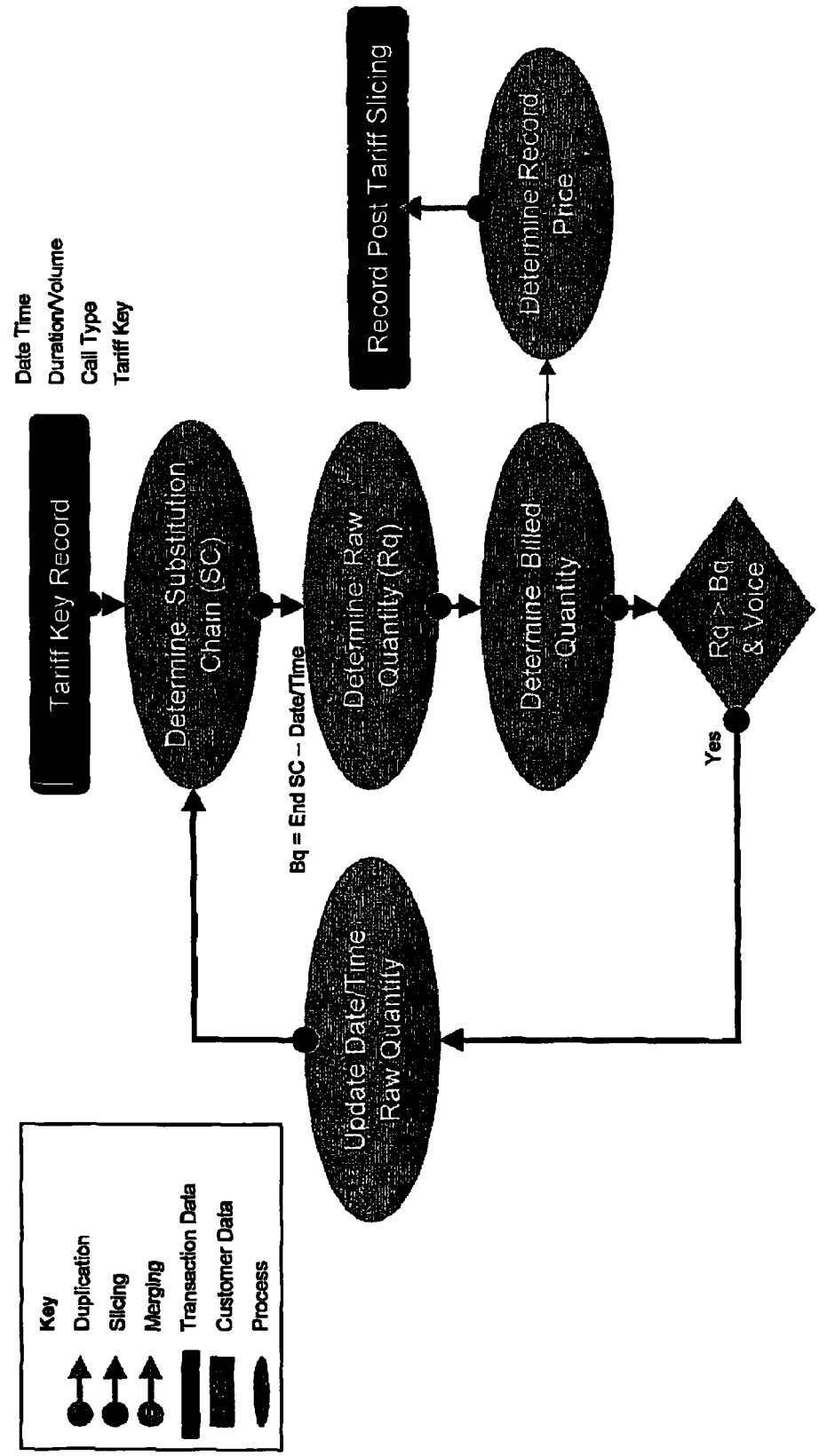
FIG. 11 provides a detailed view on how the re-rating engine processes a Tariff Key Record into a Record Post Tariff Slicing.

FIG. 11 provides a detailed view on how the re-rating engine processes a Tariff Key Record into a Record Post Tariff Slicing. The slicing processes the raw quantity that has to be charged to each slice (one slice for each Tariff) of the Tariff Key Record.

Figure 12:
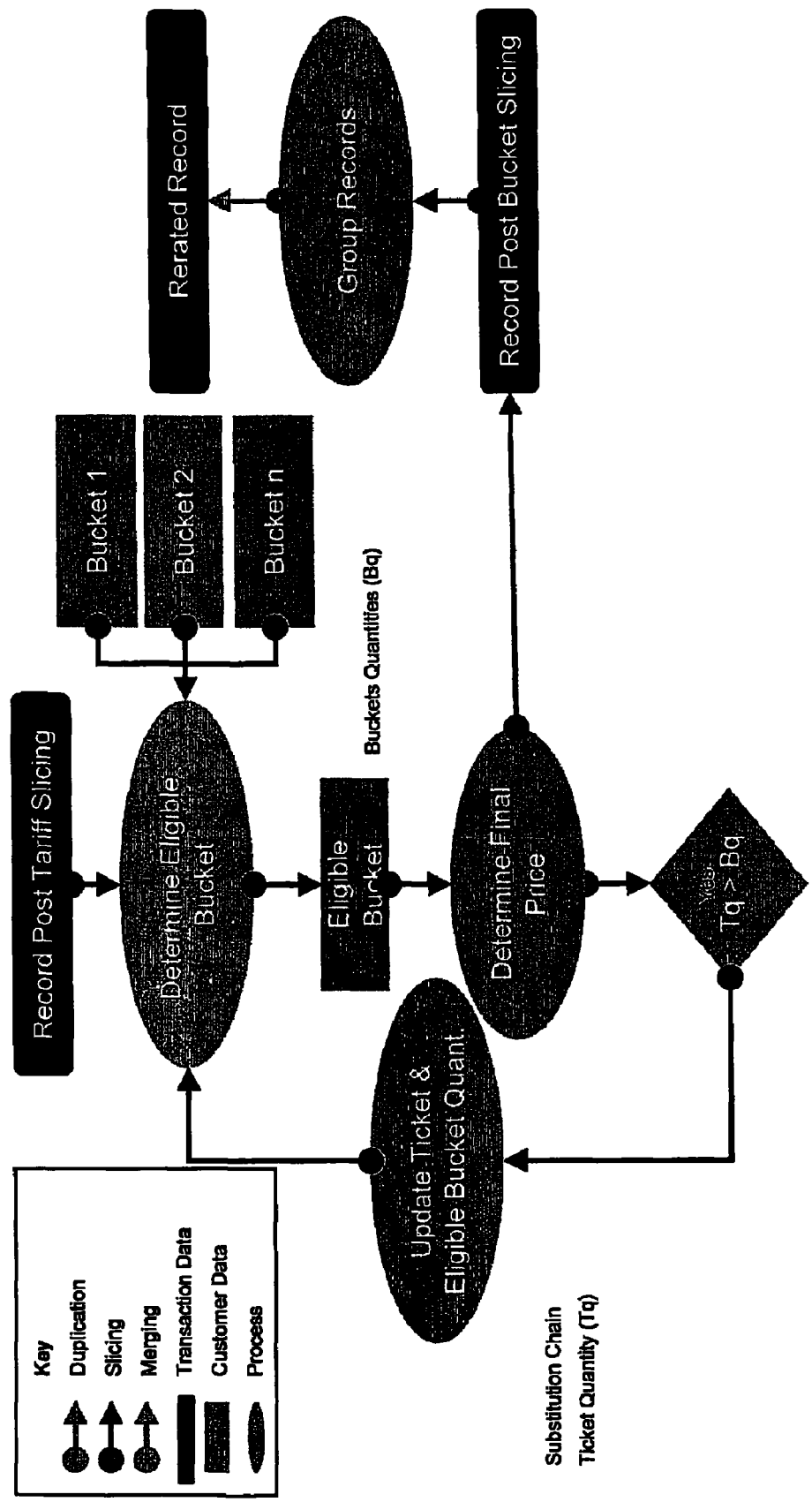
FIG. 12 provides a detailed view on how the re-rating engine processes a Record Post Tariff Slicing into a Re-rated Record.

FIG. 12 provides a detailed view on how the Re-Rating engine processes a Record Post Tariff Slicing into a Re-rated Record. The slicing processes the raw quantity that has to be charged to each slice (one slice for each Bucket) of the Record Post Bucket Slicing. Records that can be grouped are then merged into one single Re-rated Record.

Step 11: Individually Re-rate and Match Transactions

Description of Matching Process (11b)

Matching is performed using queries dealing with small discrepancies in timestamp and call duration. Basically the matching is based on 4 features:
Calling SIM or Calling Line Identity,
Timestamp,
Call Duration,
Called number.

The problem is that for a lot of Transaction the features of the Robots logs and the Invoice Lines will not perfectly match because the clock of the equipment may not be synchronized, the called number may be transformed (i.e. a short dialling number may be replace by a long number) etc.

Fuzzy Logic rules will help overcome this problem. Fuzzy Logic is a type of logic that recognizes more than simple true and false values. With fuzzy logic, propositions can be represented with degrees of truthfulness and falsehood. For example, the statement, "This Invoice Line corresponds to this Transaction, might be":
100% true if all features match ((i) the calling line identities are the same (ii) the timestamps are the same (iii) the call durations are the same (iv) the called numbers are the same);
50% true if some features match ((i) the calling line identities are the same (ii) the timestamps are the same) and some features do not match. ((iii) the call durations are not the same (iv) the called numbers are not the same));
0% true if no feature match.

By computing probability of matching between a basket of Robots logs and a basket of invoice lines it is possible to execute an individual matching that would be otherwise extremely difficult to code, if even feasible.

The level of fuzziness of the matching (i.e. the degree of truthfulness of statements) is progressively tuned so as to ensure at first an absolute matching (i.e. a pure Boolean matching) and then progressively a matching with more and more loose criteria.

The different results of the matching process can be indicated with a matching code:
"P": perfect matching between the executed communication and the invoice line
"D": matching with a discrepancy in duration
"T": matching with a discrepancy in time
"B": matching with two discrepancies in duration and in time
"L": matching with too many or too few invoice lines
"N": no invoice lines was found for the communications The comparison module indicates whether a call was matched or not. It also indicates the reason why a call couldn't be matched (for example: no call could be found within the start time tolerance range, the event type is not correct . . . ).

One of the available return codes indicates that a "candidate" event has been found but is already matched to another event. Depending on the operator rating or billing rules, this could indicate a duplicate or a former partial matching. In this case, the comparison module encompasses a "de-matcher" that "frees" the mismatched event and allows afterwards a better matching with the newer Invoice Line or Robot Log. The de-matcher may be used for other purposes: it allows de-matching calls following criteria given by the user. These criteria that can be combined are the Calling Line Identity, the Begin date and the End date.

Step 11: Individually Re-rate and Match Transactions

Description of Price Comparison (11c)

The Re-Rated Record price and the matched Invoice Line price are compared. Any discrepancy is recorded for further reporting.

Step 12: Produce Reports with Spotted Discrepancies

All spotted discrepancies are stored in the database. Several reports are produced for different observation timeframe. All reports are accessible through the management web site.

The reports and detailed information about Billing Errors are then used by the Revenue Assurance team of the Communications Company so as to fix the revenue leakages in its own TMBS.

The invention claimed is:

1. A method for monitoring traffic revenue flows for a plurality of communications companies using Information Technology (IT) systems, comprising the following steps
  (i) designing an optimal sample of transactions that maximizes the probability of detecting billing errors done by said communications companies;
  (ii) executing transactions from said optimal sample of transactions through a plurality of communications networks and recording test transactions data ,using concurrently a shared infrastructure comprising a plurality of robots for generating said transactions;
  (iii) collecting invoice lines from said IT systems in a non intrusive way, through an automated browsing of the web sites of said communications companies; so as to extract billing data for each test transaction, and
  (iv) processing said recorded test transactions data so as to re-rate billing for said test transactions, and matching said re-rated transaction billing data to billing data invoice extracted from said collected invoice lines, so as detect billing errors.

2. The method of claim 1, wherein the design of the optimal sample of transactions involves maximising the probability of detecting a plurality of billing errors while respecting a set of testing constraints.

3. The method of claim 2, wherein the designing step is based on modelling a metering and billing scheme for a communications company, by a set of components having each:
  (i) an error probability of making a billing error when processing a call detailed record (CDR); and
  (ii) a revenue share of the revenue flows within said the communications networks.

4. The method of claim 3, wherein the metering and billing scheme modelling step has a granularity defined on the basis of a predefined assessment of the level of risk of Billing Errors.

5. The method of claim 1, wherein communications companies using the shared infrastructure can place transaction requests by the means of web services requests automatically processed by a gateway within the shared infrastructure.

6. The method of claim 1, wherein transaction requests posted by the communications companies are automatically inserted in a call production plan implemented by a planning engine within the shared infrastructure.

7. The method of claim 6, wherein the transactions requests posted by the communications companies are re planned by the planning engine in case of resources contention.

8. The method of claim 7, wherein transaction requests posted by the communication companies may be loosely defined by said communications companies and automatically supplemented by the planning engine.

9. The method of claim 6, wherein transaction requests posted by the communication companies may be loosely defined by said communications companies and automatically supplemented by the planning engine.

10. The method of claim 1, wherein transaction bill re-rating step is performed through a contextual rating engine enabling to simulate on purpose a false price for a transaction that has led to a Billing Error, so as to check correctly the billing of subsequent transactions involved in the same pricing scheme and that would otherwise appear as incorrectly billed.

11. The method of claim 1, wherein the transaction re-rating step generates duplicate records so as to emulate a multi line billing scheme implemented by a communications company to rate transactions overlapping two tariff plans or two buckets.

12. The method of claim 1, wherein the bill matching step is based on features matching Calling Line Identity, Timestamp, Call Duration and Called number.

13. The method of claim 12, wherein the bill matching step is represented with degrees of truthfulness and falsehood.

14. The method of claim 12, wherein individual degrees of matching for each transaction from a basket of transactions are aggregated so as to generate a maximum of likelihood to match one robot log to one or several invoice lines.

15. The method of claim 1, wherein the individual matching of transaction handles the matching of a transaction record with several invoice lines.

16. A system for monitoring traffic revenue flows for a plurality of communications companies using Information Technology (IT) systems, comprising:
- means for designing an optimal sample of transactions that maximizes the probability of detecting billing errors done by said communications companies;
- a plurality of robots within a shared infrastructure, for executing transactions from said optimal sample of transactions, through a plurality of communications networks,
- means for recording test transactions data,
- means for collecting invoice lines from said IT systems s in a non intrusive way, through an automated browsing of the web sites of said communications companies; so as to extract billing data for each test transaction, and
- means for processing said recorded test transactions data so as to re-rate billing for said test transactions, and for matching said re-rated transaction billing data to billing data invoice extracted from said collected invoice lines, so as detect billing errors.

17. The system of claim 16, further including a gateway within the shared infrastructure, for receiving transaction requests posted by communications companies through web services.

18. The system of claim 16, further including a planning engine for implementing a call production plan wherein transactions requests posted by the communications companies are automatically inserted.

19. The system of claim 18, wherein the planning engine is provided for re-planning transactions requests posted by communications companies, in case of resources contention.

* * * * *